(12) United States Patent
Wolf et al.

(10) Patent No.: US 7,660,227 B2
(45) Date of Patent: *Feb. 9, 2010

(54) OPTICAL INFORMATION RECORDING MEDIUM BASED ON INTERFERENCE OF CONVERGING SPHERICAL WAVES

(75) Inventors: Emil Wolf, Rochester, NY (US); Yajun Li, Oakdale, NY (US)

(73) Assignee: Time Warner Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,245

(22) Filed: Apr. 25, 2008

(65) Prior Publication Data

US 2009/0103426 A1 Apr. 23, 2009

Related U.S. Application Data

(63) Continuation of application No. 11/338,000, filed on Jan. 23, 2006, now abandoned, which is a continuation of application No. 10/202,983, filed on Jul. 24, 2002, now abandoned, which is a continuation-in-part of application No. 09/843,343, filed on Apr. 25, 2001, now Pat. No. 6,771,585.

(60) Provisional application No. 60/201,562, filed on May 1, 2000.

(51) Int. Cl.
*G11B 7/24* (2006.01)
(52) U.S. Cl. .................. 369/275.1; 369/275.4
(58) Field of Classification Search ... 369/275.1–275.5; 428/64.1, 64.4; 430/320, 321, 270.1, 270.11, 430/270.13
See application file for complete search history.

(56) References Cited

U.S. PATENT DOCUMENTS 4,041,530 A * 8/1977 Kramer et al. ........... 369/275.5

(Continued)

*Primary Examiner*—Tan X Dinh
(74) *Attorney, Agent, or Firm*—Gottlieb, Rackman & Reisman, PC

(57) ABSTRACT

An improved light-readable information recording medium is provided that comprises an optical data storage structure having lands and pits, in which the depth of the pits is about:

$$\frac{\lambda}{2n}\frac{m}{1+M_T^2},$$

wherein $\lambda$ is the wavelength of light used to read the information recording medium, m is the order of interference selected from a group consisting of odd integers, $M_T$ is the transverse magnification, and n is the refractive index encountered by the reading light inside the pits. The invention also provides an improved optical reading system with the parameters satisfying the relationship:

$$nd = \frac{\lambda}{2n}\frac{m}{1+M_T^2},$$

wherein $\lambda$ is the wavelength of light used to read the information recording medium, m is the order of interference selected from a group consisting of odd integers, $M_T$ is the transverse magnification, n is the refractive index encountered by the reading light inside the pits, and d is the depth of the pits.

9 Claims, 9 Drawing Sheets

U.S. PATENT DOCUMENTS

| | | | | |
|---|---|---|---|---|
| 4,965,153 A | * | 10/1990 | Imataki et al. | 430/11 |
| 5,068,846 A | * | 11/1991 | Kramer | 369/275.1 |
| 5,144,552 A | * | 9/1992 | Abe | 369/275.4 |
| 5,182,743 A | * | 1/1993 | Tinet | 369/275.4 |
| 5,475,537 A | * | 12/1995 | Kobayashi et al. | 359/794 |
| 5,995,481 A | * | 11/1999 | Mecca | 369/275.4 |
| 6,771,585 B2 | * | 8/2004 | Li et al. | 369/112.24 |
| 6,826,143 B1 | * | 11/2004 | Kermani | 369/275.1 |
| 7,339,875 B2 | * | 3/2008 | Maeda | 369/111 |

* cited by examiner

OPTICAL INFORMATION RECORDING MEDIUM BASED ON INTERFERENCE OF CONVERGING SPHERICAL WAVES

CROSS REFERENCE TO RELATED APPLICATIONS

This application is a continuation of co-pending U.S. patent application No. 11/338,000, filed Jan. 23, 2006, which is a continuation of U.S. patent application No. 10/202,983, filed Jul. 24, 2002, which is a continuation-in-part of U.S. application No. 09/843,343, filed on Apr. 25, 2001, now U.S. Pat. No. 6,771,585, which claims the benefit of U.S. Provisional Application No. 60/201,562, filed on May 1, 2000. The entire disclosures of these applications are hereby incorporated by reference herein in their entireties.

BACKGROUND OF THE INVENTION

This invention relates to an improved design of information recording media, for example in the form of light-readable discs, and an improved design of optical reading equipment used for reading such information recording media. These improved designs, among other advantages, will allow greater tolerances in manufacturing of the information recording media and will permit the use of less expensive optical reading equipment.

Information recording media in the form of light-readable discs are well known, as shown, for example in Kramer U.S. Pat. No. 5,068,846 and Mecca U.S. Pat. No. 5,995,481. Commercially available audio compact discs ("CDs") and compact disc read-only memories ("CD-ROMs") are examples of recording media of this general type.

The predominant portion of a typical light-readable disc comprises a transparent material, such as polycarbonate plastic. Information in the form of binary data is contained in a pit and land structure impressed along the top surface of this transparent material. The structure is covered by a very thin metal reflective layer, typically aluminum. A protective layer, typically lacquer, is then placed over the reflective layer, so that the protective layer fills the indentations in the reflective layer and provides a smooth, substantially planar upper surface for the disc on which a label or other information may be placed.

The pits and lands optical structure of the light-readable discs medium can be read by a laser beam focused on the reflective layer. The laser beam passes through the bottom of the transparent material and through the optical structure of pits and lands (which is seen by the laser from below as a series of bumps and lands), and is reflected off the reflective layer, through the transparent material and out of the medium to an optical reading structure.

Several publications conclude, based on elementary properties of interference between the incident and reflected waves, that the maximum extinction of the returned light is obtained when the light reflected by a pit is in antiphase with the light reflected by the surrounding land, namely, when the pit depth/bump height (depending on the plane of reference) is a quarter-wavelength. (G. Bouwhuis et al., *Principles of Optical Disc System*, 1$^{st}$ ed.(1985); K. Pohlmann, The Compact Disc, Updated ed. (1992); Dil et al., *J. Opt. Soc. Am.*, 69: 950 (1979)). This has led to the standardization of pit depth/bump height (depending upon the plane of reference) in commercial light-readable information recording media at just less than approximately one-quarter of the wavelength of the laser light within the transparent material.

However, recent findings revealed that the quarter wavelength criterion did not predict optimum results under all circumstances. As reported in Mecca U.S. Pat. No. 5,995,481, it had been determined that an improved light-readable recording disc was achieved by designing the pit depth/bump height to be approximately one-half of the wavelength of the laser light source. Not only such a disc had been found to be operable, but it had been determined that the intensity difference between the bump and land areas detected by an optical reader was actually greater than for the one-quarter wavelength pit previously thought to be optimal.

Numerous efforts had been undertaken to understand and/or explain the unexpected and improved results obtained by controlling pit height to approximately one-half the wavelength of light. None have borne fruit until now.

The present invention provides a way to optimize performance of both information recording media and the optical reading equipment by using a two-point-source model to simulate the waves reflected from the data surface of the recording media. The improved results promise substantial savings in the design and manufacture of less sensitive and less costly light-reading systems, as well as in disc manufacturing. Since a higher intensity signal difference is generated, manufacturing tolerances can be relaxed without sacrificing quality in the output and reading of data, leading to higher yields and lower costs.

In view of the foregoing, it is an object of this invention to provide a light-readable information recording medium and an optical reader that generate greater signal intensity difference, which can improve the quality of reproduction, reduce the cost and complication of optical reading devices, and provide for greater tolerance in the manufacturing of such recording media.

SUMMARY OF THE INVENTION

These and other objects of the present invention are accomplished as follows. According to the new model, two spherical (not plane) waves return from the data surface and travel to the objective lens. One spherical wave is due to the reflection of the read-out beam from the pit, the other is due to the reflection from the surrounding land. The returning field then results from the superposition of two spherical waves, which first diverge from the disc and are then focused by the objective lens onto the photodetector. Consequently, according to the model presented in this invention, one is dealing with interference of two converging spherical waves with slightly different foci, slightly different focal lengths and slightly different cone angles, rather than with interference of two plane waves. The focal regions of the two converging spherical waves are overlapping and the interference of the two focused spherical waves takes place in the common region.

This two-point-source model was next applied to investigate how binary data recorded on a surface of an information recording medium are transferred into series of light pulses. The analysis resulted in an expression for the optical pit depth in terms of the system parameters for which destructive interference leads to a maximum extinction of the light in the focal region:

$$\Delta_{opt} = \frac{\lambda}{2} \frac{m}{1 + M_T^2},$$

wherein $\lambda$ is the wavelength of the light used to read the information recording medium, m is the order of interference selected from a group consisting of odd integers, and $M_T$ is the transverse magnification of the reader.

Accordingly, the present invention provides an information recording medium, which can be read by an optical reader using reflected light, comprising an optical data storage structure including pits and lands, in which the depth of the pits is equal to about:

$$\frac{\lambda}{2n}\frac{m}{1+M_T^2},$$

wherein $\lambda$ is the wavelength of the light used to read the information recording medium, m is the order of interference selected from a group consisting of odd integers, n is the refractive index of the media encountered by the reading light inside the pits, and $M_T$ is the transverse magnification of the optical reader.

In addition, the invention facilitates building a system for optically reading stored information, which comprises an information recording medium having a light-reflecting surface formed as a data storage structure including pits and lands, a light source directed at the data storage structure so that the light is reflected in accordance with the information recorded using pits and lands, and an optical reader for detection of the reflected light and reading of the information recorded by means of pits and lands. According to the principles of the invention, the wavelength $\lambda$ of the light used to read the information recording medium, the interference order m selected from a group consisting of odd integers, the transverse magnification $M_T$ of the optical reader, the refractive index n of the media within the pits, and the depth of the pits d satisfy the following relationship:

$$nd = \frac{\lambda}{2}\frac{m}{1+M_T^2}.$$

Further features of the invention, its nature and various advantages will be more apparent from the accompanying drawings and the following detailed description of the invention.

BRIEF DESCRIPTION OF THE DRAWINGS

FIG. 1a shows the notation used. FIG. 1b shows two wavefronts $W_1$ and $W_2$ of radii $R'_1$ and $R'_2$, centered at the points $S'_1$ and $S'_2$ respectively and passing through the center O of a circular aperture of radius $\alpha$.

DETAILED DESCRIPTION OF THE INVENTION

The objects of the invention are accomplished by considering a model describing the interaction of two converging spherical waves in the focal region of an optical reading system, applying this model to investigate how the binary data recorded on a light-readable information recording medium's surface are transferred into a series of light pulses, and deriving the relationship that must govern the parameters of a light-readable information recording medium and the system used to read it, so that destructive interference leads to a maximum extinction of light in the focal region.

I. Imaging of Two Point Sources

Figure 1A:
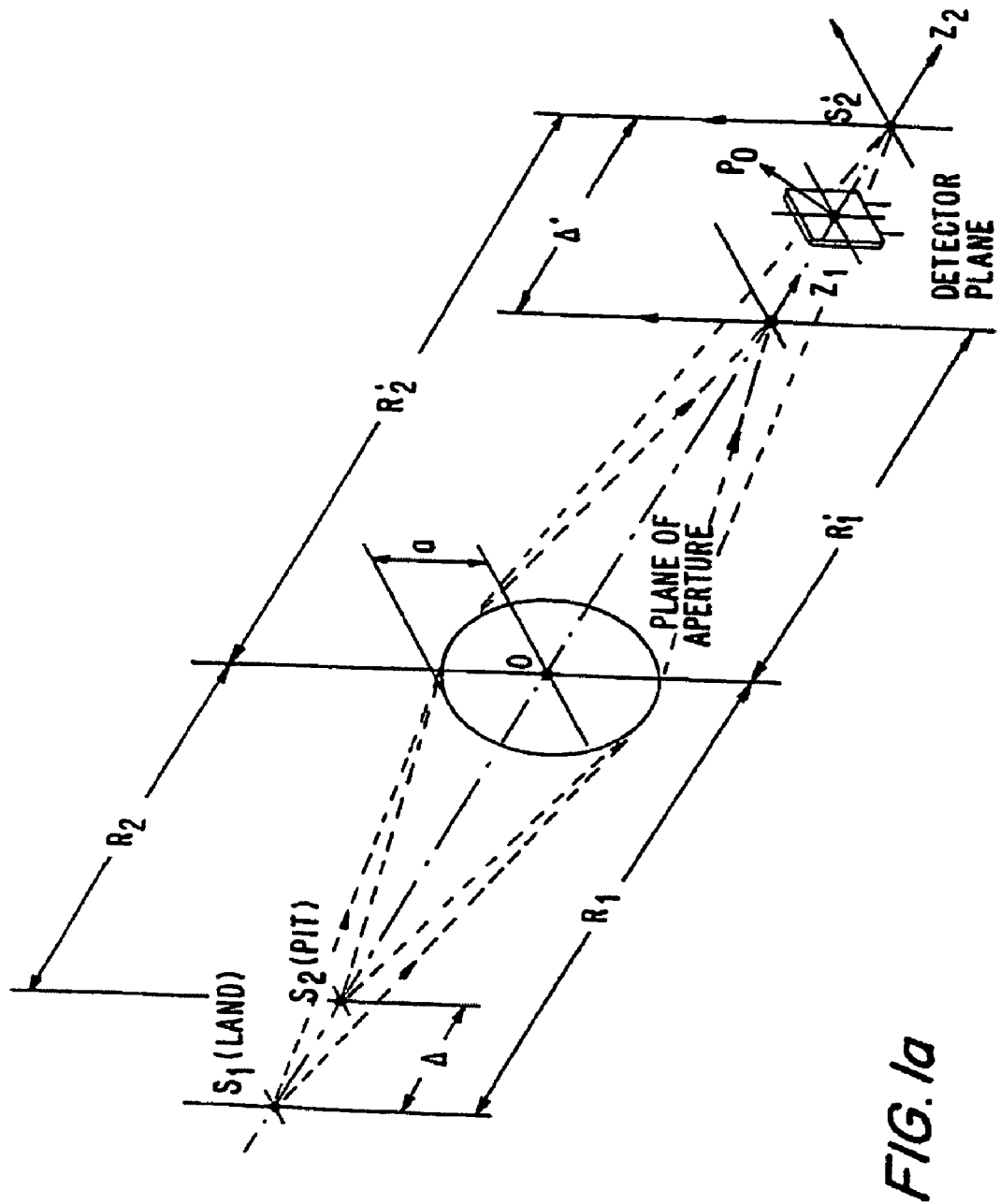
FIGS. 1a and 1b represent a two-point-source model of light interaction with a pits and lands structure: Two monochromatic point sources $S_1$ and $S_2$, generating light of the same wavelength $\lambda$, are located on the axis of the objective lens. The point source $S_1$ is associated with reflection of the light from the land. The point source $S_2$ is associated with the reflection of the light from the pit. $\Delta$ denotes the pit depth.

Consider two point sources $S_1$ and $S_2$ of light of the same wavelength $\lambda$, which are placed close to each other on the axis of a thin lens of focal length f, which fills an aperture of radius $\alpha$ as shown in FIG. 1a. Let $$\Delta = R_1 - R_2 \quad (1)$$

be the separation of points $S_1$ and $S_2$, with $R_1$ and $R_2$ being the radii of curvature of the two spherical wavefronts immediately behind the thin lens. On the other side of the lens, two spherical wavefronts emerge, converging to points $S'_1$ and $S'_2$. We denote their radii of curvature by $R'_1$ and $R'_2$, respectively. For the point source $S_1$, the radii of curvature $R_1$ and $R'_1$ satisfy the lens relation:

$$\frac{1}{R_1} + \frac{1}{R'_1} = \frac{1}{f}, \quad (2)$$

and for the point source $S_2$, the radii of curvature $R_2$ and $R'_2$ satisfy a similar relation:

$$\frac{1}{R_2} + \frac{1}{R'_2} = \frac{1}{f}. \quad (3)$$

The separation of the image points $S'_1$ and $S'_2$ is given by (see FIG. 1a):

$$\Delta' = R'_1 - R'_2 = -M_T^2 \times \Delta, \quad (4)$$

where $M_T$ is the transverse magnification of the system. Here we have assumed that the two spherical wave systems have the same transverse magnification.

II. Diffraction Integrals

Figure 1B:
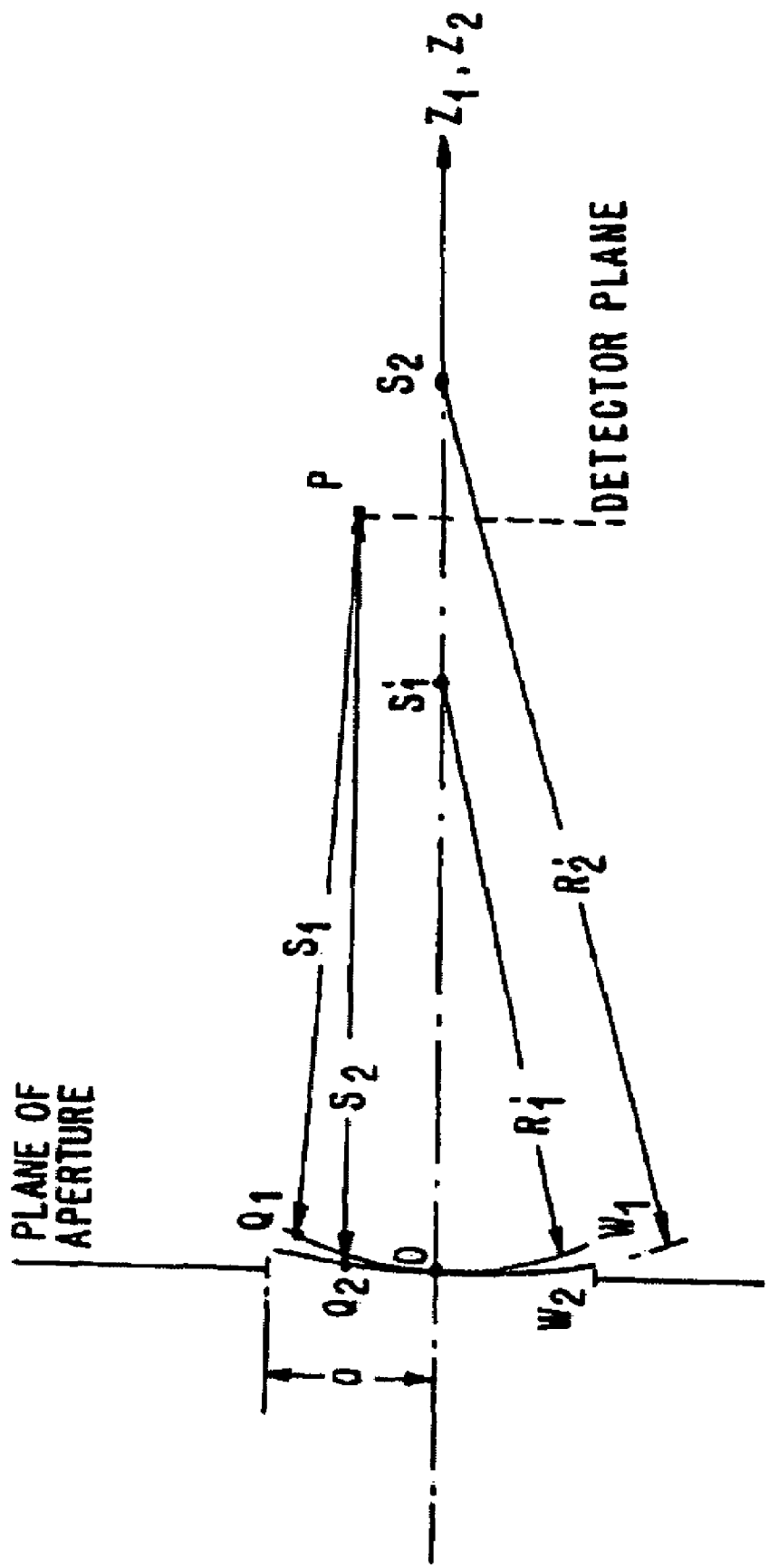

As we have indicated, we consider two spherical waves, say $V_1^{(t)}$ and $V_2^{(t)}$, generated by the two point sources $S_1$ and $S_2$, emerging from the aperture. At typical points $Q_1$ and $Q_2$ on the wavefronts (see FIG. 1b) that pass through the center O of the aperture, the field distributions can be expressed in the form:

$$V_1^{(t)}(Q_1, t) = A \frac{e^{-ikR_1'}}{R_1'} e^{-i\omega t}, \quad (5a), (5b)$$

$$V_2^{(t)}(Q_2, t) = A \frac{e^{-i(kR_2'+\theta_0)}}{R_1'} e^{-i\omega t},$$

where A is a constant amplitude, t denotes the time and $$\theta_0 = k\Delta \quad (6)$$

is the phase shift introduced by the spatial separation $\Delta$ of the two point sources $S_1$ and $S_2$.

According to the Huygens-Fresnel principle (M. Born & E. Wolf, *Principles of Optics*, 7$^{th}$ ed. (1999), sec. 8.2), the diffracted fields at a point P of the detector plane (see FIG. 1b) are given by the expressions (with time-periodic factor $\exp(-i\omega t)$ omitted):

$$U_1(P) = -\frac{i}{\lambda} \frac{Ae^{-ikR_1'}}{R_1'} \int_{W_1} \int \frac{e^{ikz_1}}{s_1} dS, \quad (7a)$$

and $$U_2(P) = -\frac{i}{\lambda} \frac{Ae^{-i(kR_2'+\theta_0)}}{R_2'} \int_{W_2} \int \frac{e^{ikz_2}}{s_2} dS, \quad (7b)$$

where $s_1$ and $s_2$ denote the distances $Q_1P$ and $Q_2P$ and the integrals extend over the wavefronts $W_1$ and $W_2$ filling the aperture.

Let $(z_1, r_1, \psi_1)$ and $(z_2, r_2, \psi_2)$ be the two sets of coordinates of the point P in the focal regions of the two converging spherical waves originating from the point sources $S_1$ and $S_2$. The origins of the two coordinate systems are at $S_1'$ and $S_2'$, namely, at the image points of the point sources $S_1$ and $S_2$. The z-coordinates of the two focusing systems have a separation $$z_1 = z_2 + \Delta', \quad (8)$$

along the common direction $OS_1'$ and $OS_2'$ (see FIG. 1a). The radial distances from the z-axes are:

$$r_1 = r_2 = r \quad (9)$$

and the azimuthal angles are also equal, i.e., $\psi_1 = \psi_2 = \psi$.

It is convenient to introduce the Lommel parameters ($u_1$, $v_1$) and ($u_2$, $v_2$) which, together with the angle $\psi$ specify the position of the field point P:

$$u_1 = \left(\frac{a}{R_1'}\right)^2 kz_1, \quad v_1 = \left(\frac{a}{R_1'}\right) kr_1; \quad (10a), (10b)$$

$$u_2 = \left(\frac{a}{R_2'}\right)^2 kz_2, \quad v_2 = \left(\frac{a}{R_2'}\right) kr_2. \quad (11a), (11b)$$

Because the fields are rotationally symmetric about the z-axis, the diffracted fields are independent of the azimuthal angle $\psi$.

The photodetector, which changes the intensity variations of the light into an electrical signal, is assumed to be placed at the point $z_1 = z_0$ in the focal regions of the two converging spherical waves. We then obtained from Eqs. (10) and (11) the following expressions for the Lommel parameters in the detector plane:

$$u_1 = \left(\frac{a}{R_1'}\right)^2 kz_0, \quad v_1 = \left(\frac{a}{R_1'}\right) kr_1; \quad (12a), (12b)$$

$$u_2 = \left(\frac{a}{R_2'}\right)^2 k(\Delta' + z_0), \quad v_2 = \left(\frac{a}{R_2'}\right) kr_2 = \left(\frac{R_1'}{R_2'}\right) v_1. \quad (13a), (13b)$$

Assuming, as is usually the case, that the focusing system of focal length f has a high numerical aperture, the field in the region of the geometrical focus may be expressed in the form (Born & Wolf, sec. 8.8):

$$U(P) = -\frac{2\pi i a^2}{\lambda f^2} A e^{i\left(\frac{f}{a}\right)^2 u} \int_0^1 J_0(v\rho) e^{-\frac{1}{2}iu\rho^2} \rho d\rho, \quad (14)$$

where $J_0$ is the Bessel function of the first kind and zero order. We now apply Eq. (14) to the two converging spherical waves discus in Sec. I above.

On substituting $u = u_1$, $v = v_1$ and $f = R_1'$ into Eq. (13), we obtain for the diffracted field of the first converging spherical wave the expression:

$$U_1(P) = -\frac{2\pi i a^2}{\lambda (R_1')^2} A e^{i\left(\frac{R_1'}{a}\right)^2 u_1} \int_0^1 J_0(v_1 \rho) e^{-\frac{1}{2} i u_1 \rho^2} \rho d\rho. \quad (15)$$

Similarly, on substituting $u = u_2$, $v = v_2$ and $f = R_2'$ into Eq. (13), we obtain the following expression of the diffracted field for the second converging spherical wave:

$$U_2(P) = -\frac{2\pi i a^2}{\lambda (R_2')^2} A e^{i\left(\frac{R_2'}{a}\right)^2 u_2} \int_0^1 J_0(v_2 \rho) e^{-\frac{1}{2} i u_2 \rho^2} \rho d\rho. \quad (16)$$

The subscripts 1 and 2 affixed to the symbol U(P) for the diffracted fields indicate that they originated from the point sources $S_1$ and $S_2$, respectively.

The field distribution in the focal region arising from the supposition of the two fields given by Eqs. (15) and (16) can be expressed as:

$$U(P) = U_1(P) + U_2(P) = \quad (17)$$

-continued $$= -\frac{2\pi i a^2}{\lambda (R_1')^2} A \left\{ e^{i\left(\frac{R_1'}{a}\right)^2 u_1} \int_0^1 J_0(v_1\rho) e^{-\frac{1}{2}iu_1\rho^2} \rho d\rho + e^{i\left[\left(\frac{R_2'}{a}\right)^2 u_2 - \theta_0\right]} \left(\frac{R_1'}{R_2'}\right)^2 \int_0^1 J_0(v_2\rho) e^{-\frac{1}{2}iu_2\rho^2} \rho d\rho \right\}.$$

According to Eq. (17), the intensity distribution $I(P)=|U(P)|^2$ in the focal region is, therefore, $$I(P) = \left| 2 \left\{ \sqrt{I_{02}} \, e^{i\left(\frac{R_2'}{a}\right)^2 u_1} \int_0^1 J_0(v_1\rho) e^{-\frac{1}{2}iu_1\rho^2} \rho d\rho + \sqrt{I_{02}} \, e^{i\left[\left(\frac{R_2'}{a}\right)^2 u_2 - \theta_0\right]} \int_0^1 J_0(v_2\rho) e^{-\frac{1}{2}iu_2\rho^2} \rho d\rho \right\} \right|^2, \quad (18)$$

where $$I_{01} = \left(\frac{\pi a^2 |A|}{\lambda(R_1')^2}\right)^2 \text{ and } I_{02} = \left(\frac{\pi a^2 |A|}{\lambda(R_2')^2}\right)^2 \quad (19)$$

are constants.

III. The Validity of Eq. (17) in the Overlapping Focal Regions

Equation (17) is valid under the condition that the focal regions of two converging spherical waves overlap. Let us examine this situation.

Figure 2:
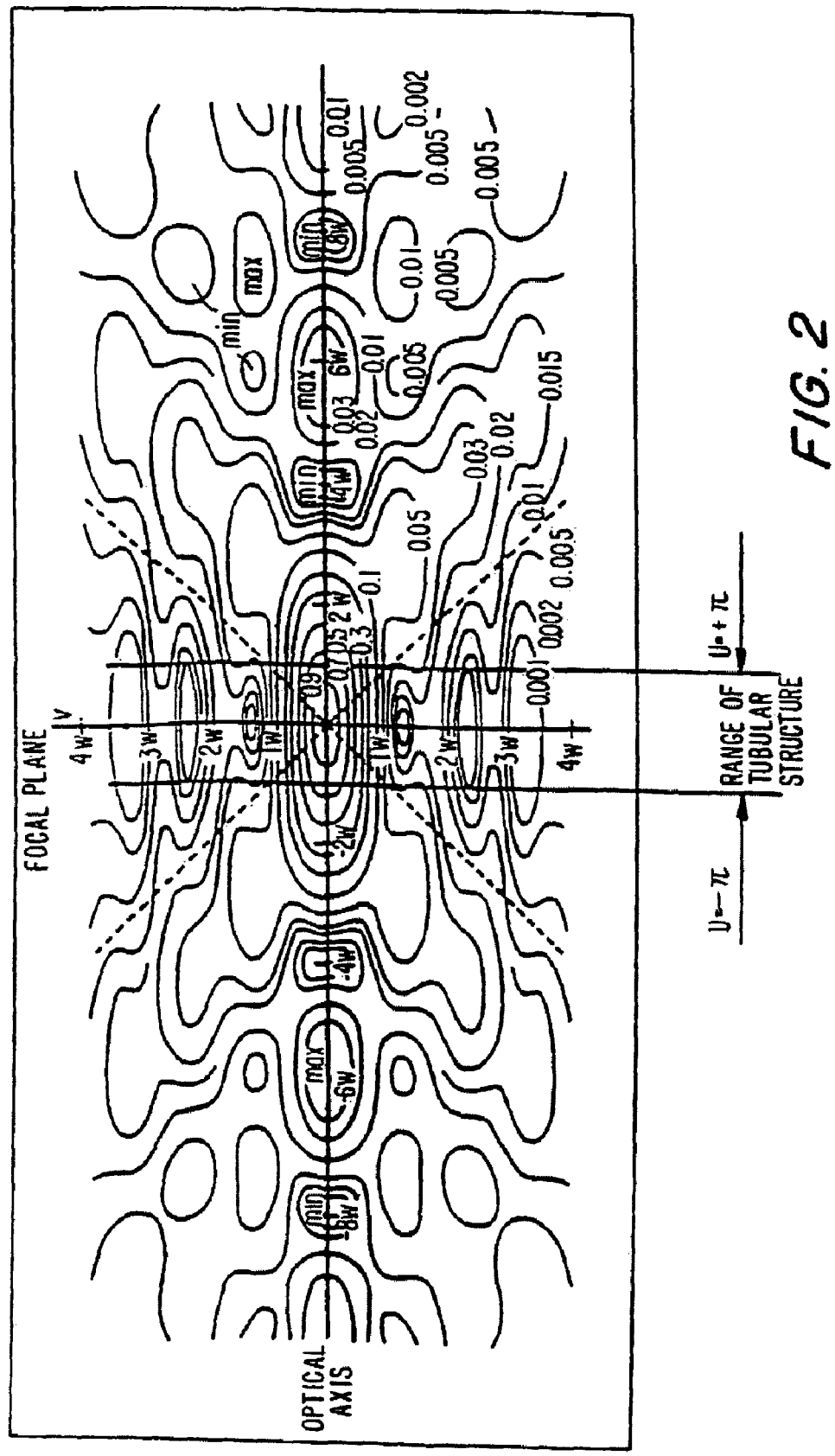
FIG. 2 represents isophotes (lines of equal intensity) in the focal region. The tubular structure of the central portion should be noted (Adapted from E. H. Linfoot and E. Wolf, *Proc. Phys. Soc., B*, 69 (1956), 823).
Figure 8:
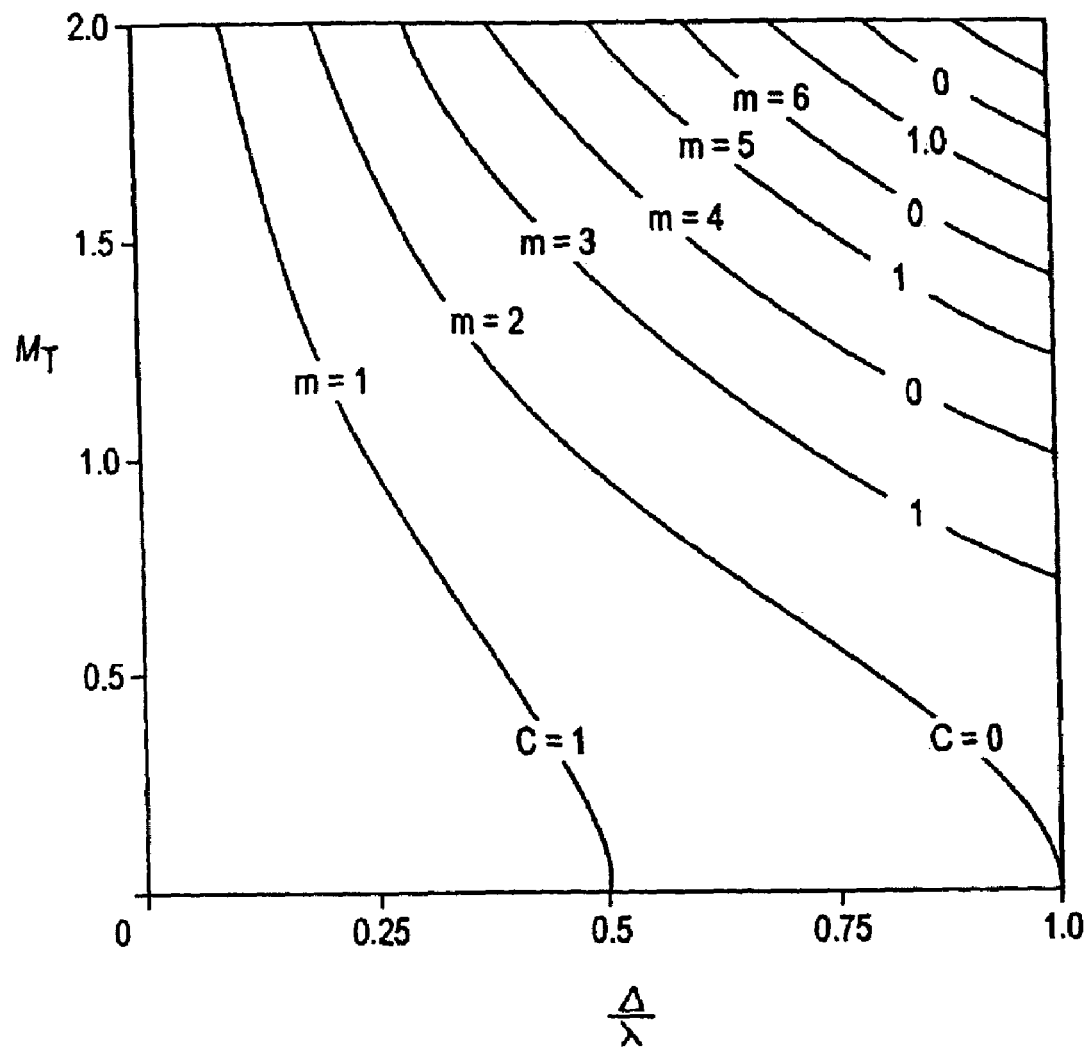
FIG. 8 shows contour lines of equal contrast C as a function of pit depth and of the order of interference m.

The three-dimensional light-distribution near the focus can be represented by isophotes, namely by contour lines of equal intensity (see FIG. 2 or FIG. 8.41 of Born & Wolf). Important for our consideration is the tubular structure in the blight central portion of the figure, which indicates the focal depth. The focal depths of the focused fields originated from the point sources $S_1$ and $S_2$ are of the order of (Born & Wolf, Eq. (27) in sec. 8.8):

$$|\Delta z_1| = \frac{\lambda}{2}\left(\frac{R_1'}{a}\right)^2 \text{ and } |\Delta z_2| = \frac{\lambda}{2}\left(\frac{R_2'}{a}\right)^2. \quad (20a), (20b)$$

Hence Eq. (17) will be a good approximation provided that:

$$|\Delta'| \leq |\Delta z_1| \text{ and } |\Delta'| \leq |\Delta z_2|. \quad (21a), (21b)$$

On substituting for Eqs. (4), (20a) and (20b) into Eqs. (21a) and (21b), we obtain the following estates for the range of validity of our theory:

$$M_T^2 \times \Delta \leq \frac{\lambda}{2}\left(\frac{R_1'}{a}\right)^2 \text{ and } M_T^2 \times \Delta \leq \frac{\lambda}{2}\left(\frac{R_2'}{a}\right)^2. \quad (22a), (22b)$$

With the choice $\Delta=\lambda/2$ and $M_T \approx (R_1'/R_1) \approx (R_2'/R_2)$, Eqs. (22a) and (22b) become:

$$\alpha \leq R_1 \text{ and } \alpha \leq R_2 \quad (23a),(23b)$$

The numerical aperture of commonly used objective lens lies in the range between about 0.43 to 0.5, i.e., $R_1$ and $R_2$ are in the range between $1.73\alpha$ and $2.10\alpha$. Hence, the inequalities in Eqs. (23a) and (23b) are satisfied. We may, therefore, conclude that the tubular structures of the focal regions of two converging spherical waves overlap and Eq. (17) correctly describes the combined effects of the two waves in the overlapping focal regions.

IV. Interference Effects in the Focal Region

To obtain a better insight into the structure of the region of superposition, we rewrite Eq. (18) in the form:

$$I(P)=I_1(P)+I_2(P)+2\sqrt{I_1(P)I_2(P)}\cos(\phi_1-\phi_2), \quad (24)$$

where $$I_1(P) = I_{01} \left| 2\int_0^1 J_0(v_1\rho) e^{-\frac{1}{2}iu_2\rho^2} \rho d\rho \right|^2, \quad (25a)$$

and $$I_2(P) = I_{02} \left| 2\int_0^1 J_0(v_2\rho) e^{-\frac{1}{2}iu_2\rho^2} \rho d\rho \right|^2, \quad (25b)$$

are the intensity distributions in focal regions of the two converging spherical waves that represent the waves returning from the pit and from the surrounding land on the data surface of a recording medium respectively. After a long calculation, the phase factors $\phi_1$ and $\phi_2$ can be expressed in the form:

$$\phi_1 = \left(\frac{R_1'}{a}\right)^2 u_1, \quad (26a)$$

$$\phi_2 = \left(\frac{R_2'}{a}\right)^2 u_2 - \theta_0. \quad (26b)$$

where $\theta_0$, given by Eq. (6), represents the phase shift between the two returned waves. Let us suppose that the photodetector is located at the distance:

$$z_0=-\Delta'/2 \quad (27)$$

from the point $S_1'$. It then follows from Eqs. (12a) and (13a) that:

$$u_1 = -k\left(\frac{a}{R_1'}\right)^2 \frac{\Delta'}{2} \text{ and } u_2 = -k\left(\frac{a}{R_2'}\right)^2 \frac{\Delta'}{2}. \quad (28a), (28b)$$

On substituting Eqs. (28a) and (28b) into Eqs. (26a) and Eq. (26b), we obtain for the phase difference $\phi_1-\phi_2$ the expression:

$$\phi_1 - \phi_2 = \left(\frac{R_1}{a}\right)^2 u_1 - \left(\frac{R_2}{a}\right)^2 u_2 + \theta_0. \quad (29)$$

Next, on substituting from Eqs. (4), (6), (28a) and (28b) into Eq. (29), we find that:

$$\phi_1-\phi_2=-k\Delta'+k\Delta=k\Delta(1+M_T^2). \quad (30)$$

When the laser spot on the disc surface scans over a pit, the intensity in the overlapped region is given by the expression:

$$I_{pit}(P)=I_1(P)+I_2(P)+2\sqrt{I_1(P)I_2(P)}\cos[k\Delta(1+M_T^2)]. \quad (31)$$

On the other hand, when the laser spot scans over the land, the phase difference $\phi_1-\phi_2=(m-1)\pi$, $(m=1, 3, 5 \ldots)$. The intensity in the overlapped region is then a maximum and is given by the expression:

$$I_{land}(P)=I_1(P)+I_2(P)+2\sqrt{I_1(P)I_2(P)}. \quad (32)$$

Intensity distribution in the focal region of a system of large angular aperture is symmetrical about the focal plane (see Born & Wolf, or Collett et al., *Opt. Lett.*, 5: 264 (1980)). Therefore, from Eqs. (25a) and (25b):

$$I_1(-u_1,v_1)=I_1(u_1,v_1) \text{ and } I_2(-u_2,v_2)=I_2(u_2,v_2). \quad (33a), (33b)$$

If we ignore the slight difference between $R_1'$ and $R_2'$, we find immediately from Eqs. (28a) and (28b) that $$u_1 \approx -u_2, \quad (34a)$$

and from Eqs. (12b) and (13b) that $$v_1 \approx v_2. \quad (34b)$$

We can therefore conclude that $$I_1(P) \approx I_2(P) \quad (34)$$

The intensity distributions given by Eqs. (31) and (32) then reduce to $$I_{land}(P) \approx 4I_1(P) \quad (36a)$$

and $$I_{pit}(P) \approx 4I_1(P)\cos^2[k\Delta(1+M_T^2)/2] \quad (36b)$$

It follows that the contrast C of the photodetector output signal is given by the expression:

$$C = \frac{I_{land}(P) - I_{pit}(P)}{I_{land}(P) + I_{pit}(P)} \cong \frac{\sin^2[k\Delta(1+M_T^2)/2]}{1+\cos^2[k\Delta(1+M_T^2)/2]} \quad (37)$$

Figure 7:
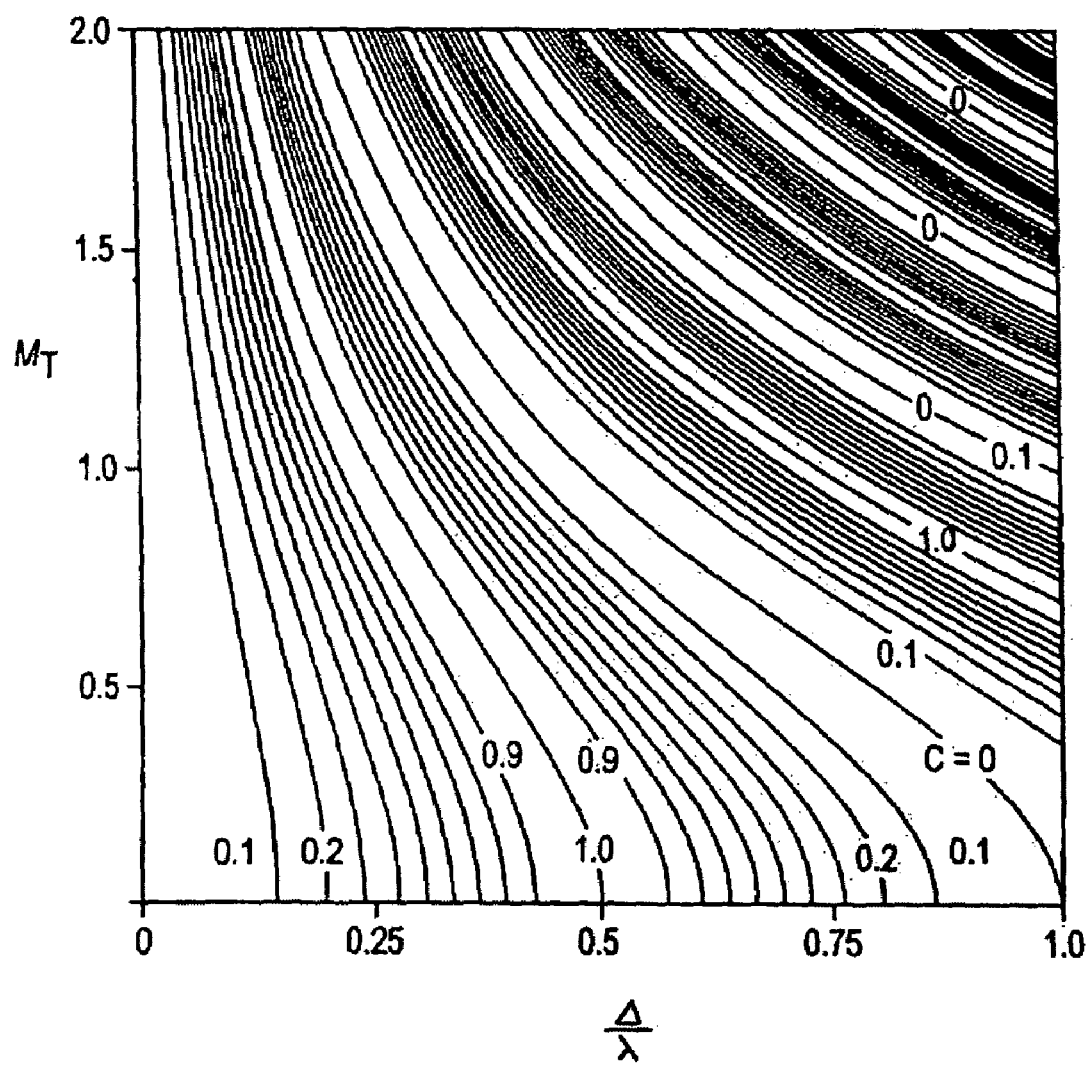
FIG. 7 shows contour lines of equal contrast C of the detector signal as a function of the pit depth and of the transverse magnification of the system.
Figure 9:
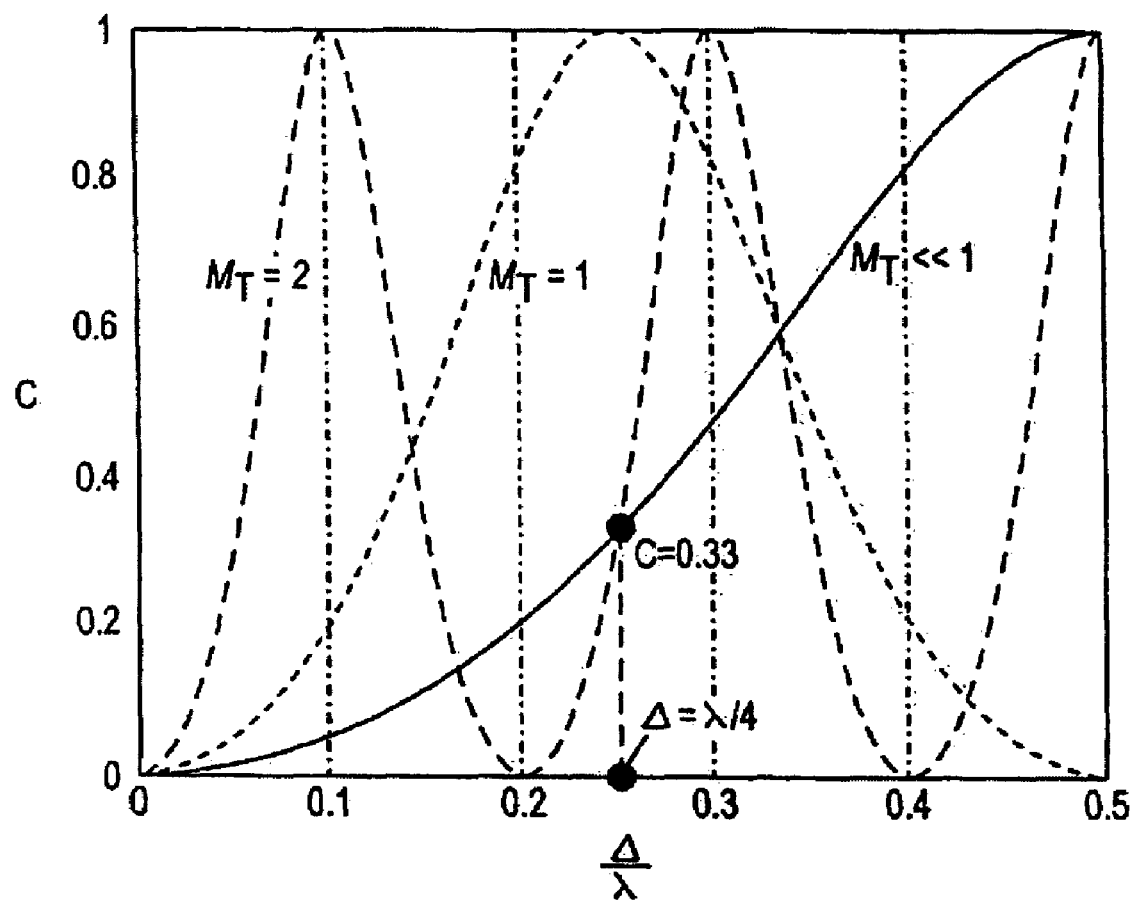
FIG. 9 shows the contrast C of receiving signal plotted as a function of $\Delta/\lambda$, when the transverse magnification $M_T$=2, $M_T$=1 and $M_T \ll 1$, showing that C varies between the values 1 and 0.

FIG. 7 presents contour lines of equal contrast C of the detector signal as a function of the pit depth $\Delta$ and of the transverse magnification $M_T$. In FIG. 9, the contrast C of receiving signal is plotted as a function of $\Delta/\lambda$, when the transverse magnification $M_T=2$, $M_T=1$, and $M_T \ll 1$, showing that C varies between the values 1 and 0. When C=0, the contrast is zero, meaning that no signal returns from the disk. This happens when $$\sin[k\Delta(1+M_T^2)/2]=0, \quad (38)$$

i.e., when $$k\Delta(1+M_T^2)=m\pi(m=0, 2, 4 \ldots), \quad (39)$$

resulting in the following expression for the pit depth:

$$\Delta = \frac{\lambda}{2}\frac{m}{1+M_T^2} \quad (m = 0, 2, 4 \ldots). \quad (40)$$

According to Equation (37), the maximum contrast C=1 is achieved when $$\sin^2[k\Delta(1+M_T^2)/2]=1 \text{ and } \cos^2[k\Delta(1+M_T^2)/2]=0, \quad (41)$$

i.e., when $$k\Delta(1+M_T^2)=m\pi(m=1, 3, 5, \ldots), \quad (42)$$

resulting in the following expression for the optimum depth of the pits:

$$\Delta_{opt} = \frac{\lambda}{2}\frac{m}{1+M_T^2}, \quad (m = 1, 3, 5, \ldots). \quad (43)$$

Figure 3:
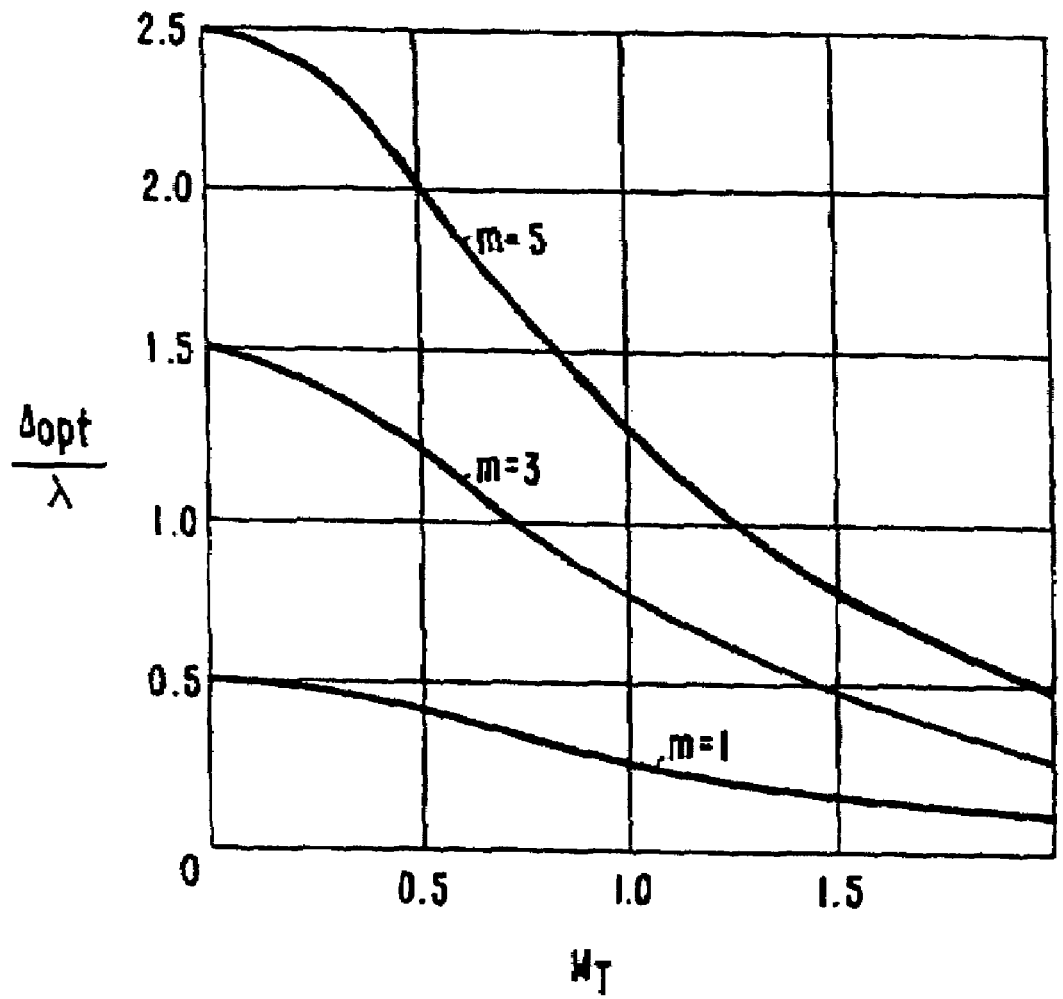
FIG. 3 shows a plot of optimum pit depth $\Delta_{opt}$ as a function of the transverse magnification $M_T$ of the system, when m=1, 3 and 5.
Figure 4:
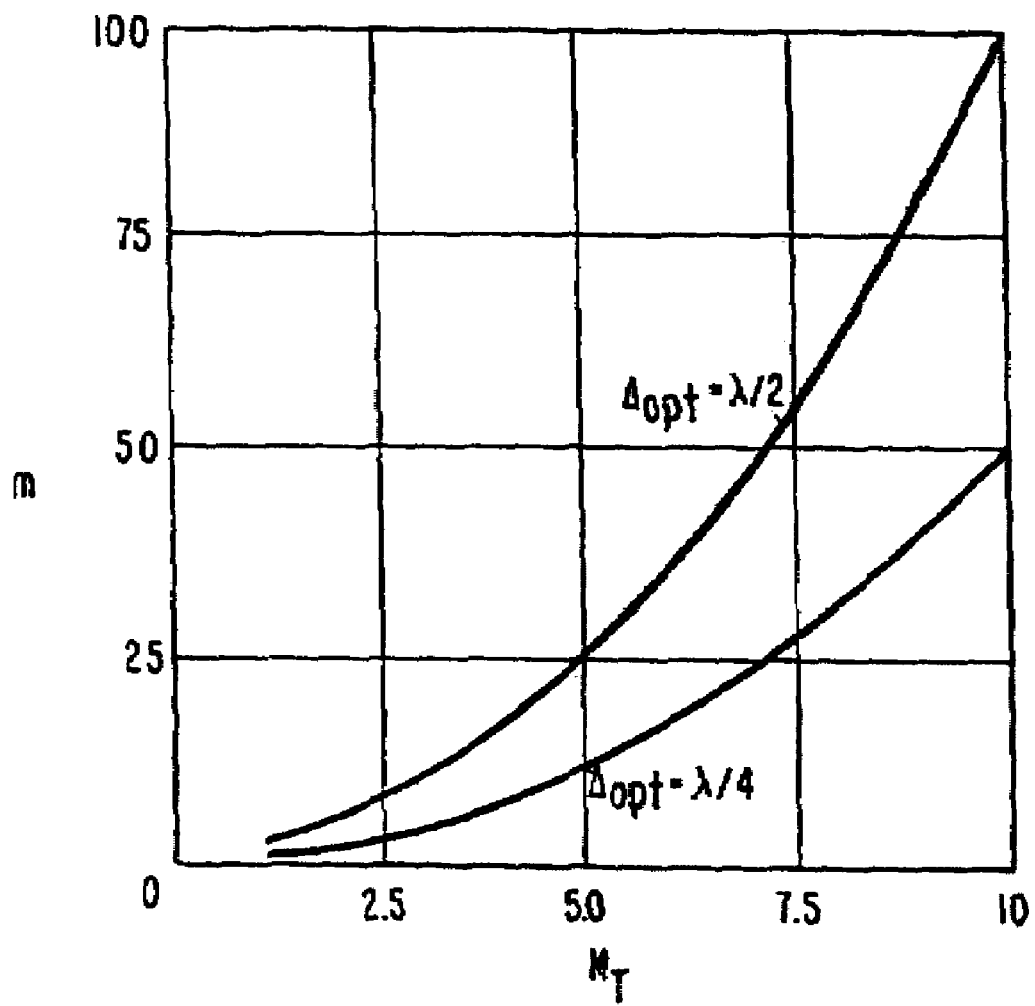
FIG. 4 shows a plot of the order of interference m as a function of the transverse magnification $M_T$ of the system, when the optimum pit depth $\Delta_{opt}$ has the values $\lambda/2$ and $\lambda/4$.

Equation (43) is the main result of our analysis. In FIG. 3 the optimum pit depth $\Delta_{opt}$ is plotted as a function of the transverse magnification $M_T$ for the cases when m=1, 3 and 5. FIG. 8 presents contour lines of equal contrast C as a function of pit depth $\Delta$ and of the order of interference m as defined in Equations (39) and (42).

It can be seen from Eq. (43) that the optimum depth $\Delta_{opt}$ of the information pits is a function of three parameters: the wavelength $\lambda$, the transverse magnification $M_T$ of the system, and the order of interference m. For systems of large magnification ($M_T^2 \gg 1$):

$$\Delta_{opt} \approx \frac{\lambda}{2}\left(\frac{m}{M_T^2}\right) \quad (m = 1, 3, 5 \ldots), \quad (44)$$

which indicates that m has the same order of magnitude as $M_T^2$, if the pit depth is not much smaller than $\lambda$. A smaller m is preferable in order to tolerate a greater error in the manufacturing process.

The equations in this text have been derived under the assumption that the disk is read in reflection from the airside. For commercially available systems, the disk is read in reflection from the substrate side. For plastic substrate with a refractive index n, Snell's law of refraction states that $n\sin\Theta$ is a constant, the numerical aperture does not change at the transition of light from plastic substrate to air. Furthermore, the phase changes associated with the wavefront distortion due to spherical aberration at the transition are assumed to have been compensated by the aspherical objective. Under these circumstances, the impact of the refraction is on the wavelength and on the cone angle, which are different on the two sides of the boundary. Taking all these factors into account, the optimum condition shown in Eq. (43) can be recessed by a simple modification of the wavelength, i.e., $$d = \frac{\lambda_n}{2}\frac{m}{1+M_T^2} \quad (m = 1, 3, 5, \ldots). \quad (45)$$

where $\lambda_n=\lambda/n$ is the wavelength in the substrate.

The foregoing analysis shows that the optimum pit depth is a function of four parameters: the wavelength $\lambda$, the magnification $M_T$ of the system, the order of interference m, and the refractive index n.

FIG. 9 shows the dependence of the optimum depth $\Delta_{opt}$ on the transverse magnification $M_T$ of the system for the case when the order of interference m=1. For a system of low magnification, namely, with $M_T \ll 1$ and for the lowest order of interference, Eq. (45) provides the following expression for the optimum pit depth:

$$d = \frac{\lambda_n}{2}. \quad (46)$$

It is also seen from FIG. 9 that the system having low transverse magnification ($M_T \ll 1$) is not optimized when $d = \lambda_n/4$. The contrast then has the value of 0.33. A disk with the pit depth equal to a quarter-wavelength is optimized only in systems with transverse magnification $M_T \approx 1$. On substituting the values $M_T = 1$ and $m = 1$ into Eq. (45), we see that $$d = \frac{\lambda_n}{4}. \quad (47)$$

We have thus shown that both the half-wavelength and the quarter-wavelength criteria can be derived from Eq. (45) under the conditions of different system magnifications. The optimum pit depth is not a universal value, but a result of optimization of the whole system when the laser of a certain wavelength is used.

Table 1 summarizes the optical characteristics of some commercially available systems.

TABLE 1

Optical characteristics of commercially available CD- and DVD-players.
The refractive index of polycarbonate substrate n ≈ 1.57

|  | Wavelength λ (nm) | Wavelength in substrate $\lambda_n$ (nm) | Depth of pit d (nm) | $d/\lambda_n$ | N.A. Disk-side | N.A. Detector-side | Transverse magnification of the system $M_T$ |
|---|---|---|---|---|---|---|---|
| CD-player | 780 | 497 | 100-120(*) | 0.20-0.24 | 0.45 | ≈0.10 | ≈5 |
| DVD-player | 650 | 414 | 100 | 0.24 | 0.60 | ≈0.15 | ≈5 |

(*)Depending on the manufacturer

The data in Table 1 indicate that the pit depths of commercially available CDs and DVDs lie approximately in the range $$\lambda/8 \leq d \leq \lambda/6. \quad (48a)$$

For plastic substrates with a refractive index of approximately 1.5, the range of the pit depths can be expressed as $$\lambda_n/5.3 \leq d \leq \lambda_n/4. \quad (48b)$$

which is close to the value of a quarter-wavelength.

For commercially available systems, we have found a unique transverse magnification $M_T \approx 5$ as shown in Table 1, which must be a design consideration for compatibility of discs of different data storage densities.

In conclusion, the pit depth of a compact disk has a profound effect on the detector signal. In practice, the choice of the pit depth would be a compromise between the signal quality and the yield of injection molding for replication of the disc. Future systems will require higher storage densities, which may need a reduction of pit width. As a consequence, the pit depth may be reduced proportionally to avoid the sharp edges of the pit that causes damage when the replica is moved from the mold. In this case, the pit depth becomes much smaller than a quarter wavelength, and only Eq. (45) can predict the optimum result.

The objects of the present invention are thus accomplished by providing, light-readable information recording media and optical systems for reading such information recording media with the relevant parameters substantially satisfying equation (43) or (45). The information recording medium can be a disc in which the optical structure is exposed to air, such that the laser light strikes a reflective surface directly.

It is of no importance to the invention whether pits or bumps are utilized along with lands in the optical storage structure, as these structures are equivalent for the purposes of this invention. As can be seen from equation (39), it is the optical distance between the bump/pit and the land that is of essence. Therefore, whenever this disclosure refers to pits and their depth, these words should be interpreted to refer to bumps and their height as well. It is also implicit that the reflecting surface of a data storage structure comprising pits and lands can be only partially reflecting.

Embodiment 1

Figure 5:
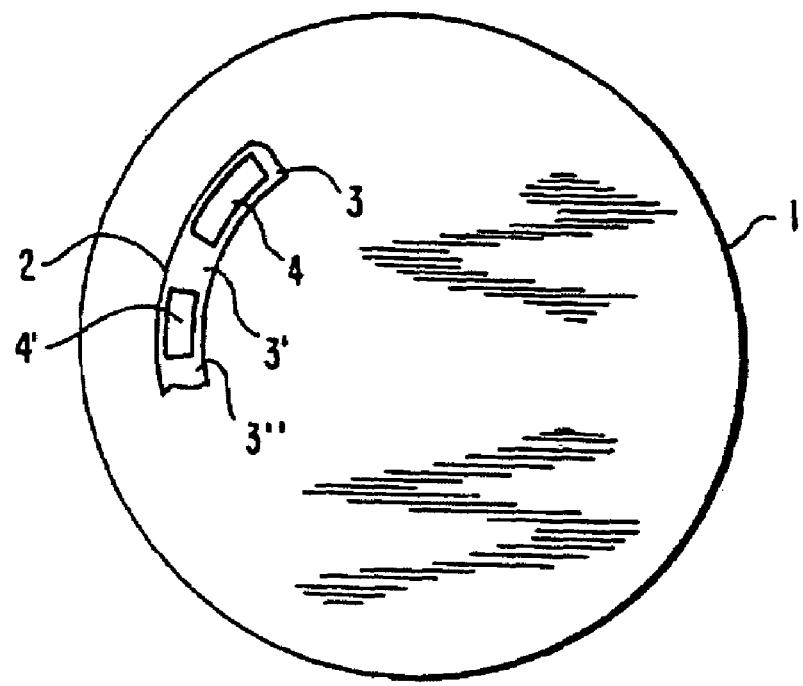
FIG. 5 is a simplified view of a light-readable information recording disc, providing an enlarged view of one-path of optically recorded information.

FIG. 5 depicts a light-readable information recording medium in the shape of a disc 1, as viewed from below. The figure also shows a greatly magnified section of one path of optically recorded information 2, in which pits/bumps are designated as 4' and 4" and lands are designated as 3, 3' and 3".

Figure 6:
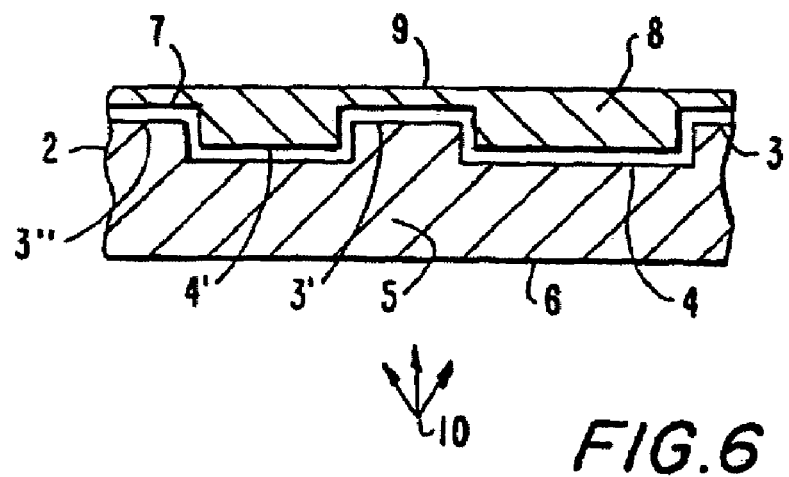
FIG. 6 is a cross-sectional view of this light-readable information recording disc, shown along the path of the recorded information.

FIG. 6 depicts a cross-sectional view along the length of this magnified section of optically recorded information 2. A transparent material 5, preferably polycarbonate (although materials such as polymethyl methacrylate and photo polymer can be used), forms the base of the disc 1, with a substantially planar lower surface 6. The top surface of the transparent material 5 is characterized by a series of lands 3, 3' and 3", separated by pits 4 and 4'. A thin layer of reflective material covers the lands 3, 3' and 3" and the pits 4 and 4' along the top surface of the transparent material 5. Although more costly materials, such as gold or silver, would yield a longer life with better reflectivity, aluminum is typically used as the reflective material 7. A protective layer 8, preferably lacquer, is placed atop the reflective material. The protective layer 8 is deposited unevenly so as to provide a substantially planar top surface 9 of the light-readable information recording disc 1. A label or other information may be placed upon this top surface 9.

Although the exact size and dimensions of the light-readable information recording disc 1 are matters of choice, the most common disc in commercial use today is 120 millimeters in diameter aid 1.2 millimeters thick. The layer of reflective material 7 is preferably about 70 nanometers thick, while the protective layer 8 ranges between 10 and 30 micrometers.

Each of these dimensions, however, is independent of the depth of pits 4 and 4'. As is further shown in FIG. 6, a light source 10 is provided beneath the substantially planar lower surface 6 of the light-readable information recording disc 1. In general commercial use today, the light source 10 is a laser operating at a wavelength of 780 nanometers in air (in a CD-player) or 650 nanometers in air (in a DVD-player). The type of light source 10 and its operating wavelength are, however, also mate of choice.

In accordance with the present invention, the operating wavelength of the light source λ, the transverse magnification of the optical reader $M_T$, the order of interference m, selected from a group consisting of odd integers, and the refractive index n of the transparent material 5 determine the depth d of pits 4 and 4':

$$d = \frac{\lambda}{2n} \frac{m}{1+M_T^2}, (m = 1, 3, 5, \ldots ).$$

Thus, for λ=780 nm, $M_T$=0.5, m=1, and n=1.55 (the refractive index of polycarbonate), the optimum depth of the pits would be about 201 nanometers. On the other hand, for λ=650 nm, $M_T$=0.5, m=1, and n=1.55, the optimum pit depth is about 168 nanometers.

Embodiment 2

According to another aspect of the present invention, parameters of the optical system used to read an information recording medium can be selected so as to maximize the light intensity differences between lands and pits for an already set depth of the pits, such as in a commercially available CD.

As shown above, for the maximum contrast, the depth of said pits should be equal to about:

$$\frac{\lambda}{2n} \frac{m}{1+M_T^2},$$

where λ is the wavelength of light, used to read the information recording medium, m is the order of interference selected from a group consisting of odd integers, $M_T$ is the transverse magnification of the reader, and n is the refractive index of the material within the pits.

If the depth of the pits of a commercially available CD is about 114 nanometers and the refractive index n is 1.55, the optimum system parameters should satisfy the relationship:

$$353(1+M_T^2) = m\lambda \text{(in nanometers)}$$

Choosing λ=780 nm and m=3, the optimum transverse magnification $M_T$ of the system becomes about 2.37. For the same wavelength at the source, if m=13, $M_T$ becomes about 5.

For a commercially available DVD with the pit depth at about 100 and n=1.55:

$$310(1+M_T^2) = m\lambda \text{(in nanometers)}$$

choosing λ=650 nm and m=13, the optimum transverse magnification $M_T$ becomes about 5, just as for a commercially available CD. Accordingly, an optic reader with the transverse magnification of 5 can be used to read both commercially available CDs and DVDs.

Embodiment 3

Finally, the present invention also facilitates building a custom-designed system for reading an information recording medium. For example, if the system requirements include a longer wavelength laser (e.g., 1064 nm min air), large magnification (e.g., 10), and a pits and lands structure that is exposed to air, the relationship of the remaining parameters is governed by the expression:

$$d \text{(in nanometers)} = 5.26 \text{ nm}.$$

It is clear that if d is on the order of several nanometers, the manufacturing of such information recording media will be difficult and costly. In the absence of additional requirements, m can be made sufficiently large, for example 41. Under these conditions, d becomes about 216 nanometers.

It will be understood that the foregoing is only illusive of the principles of this invention, and that various modifications can be made by those skilled in the art without departing from the scope and spirit of the invention.

The invention claimed is:

1. An information recording medium readable by an optical reader comprising:

transparent substrate having one substantially planar surface and a second surface opposite said first surface, said second surface formed as a data storage structure including pits and lands, in which the depth of said pits is equal to about:

$$\frac{\lambda}{2n} \frac{m}{1+M_T^2},$$

wherein λ is a wavelength of the light used to read the information recording medium, n is a refractive index of the substrate, m is the order of interference selected from a group consisting of odd integers, and $M_T$ is a transverse magnification of the reader, wherein said pit depth, d, is selected to satisfy the following condition:

$$\frac{\lambda_n}{5.3} \le d \le \frac{\lambda_n}{4}$$

a light reflecting coating on said second surface for reflecting said light passed through said transparent substrate, said coating conforming to the contours of said second surface so that said light is reflected back through the transparent substrate in accordance with the information recorded by means of said pits and lands.

2. The information recording medium defined in claim 1, wherein said medium is disc-shaped.

3. The information recording medium defined in claim 1, wherein said transparent substrate is selected from the group consisting of polymethyl methacrylate, photo polymer and polycarbonate.

4. The information recording medium defined in claim 1, wherein said light-reflecting coating is selected from the group consisting of gold, silver and aluminum.

5. An information recording medium readable by an optical reader comprising:

a transparent substrate having one substantially planar surface and a second surface opposite to said first surface, said second surface formed as a data storage structure including pits and lands, in which the depth of said pits is equal to about:

$$\frac{\lambda}{2n}\frac{m}{1+M_T^2},$$

wherein λ is a wavelength of the light used to read the information recording Medium, n is a refractive index of the substrate, m is the order of interference selected from a group consisting of odd integers, and $M_T$ is a transverse magnification, wherein said pit depth, d, is selected to satisfy the following condition:

$$\frac{\lambda_n}{5.3} \le d \le \frac{\lambda_n}{4}$$

a light-reflecting coating on said second surface for reflecting said light passed through said transparent substrate, said coating conforming to the contours of said second surface so that said light is reflected back through the transparent substrate in accordance with the information recorded by means of said pits and lands; and a protective coating having a first surface conforming to the contours of said light-reflecting coating and a second surface opposite to said first surface being substantially planar.

6. The information recording medium defined in claim 5, wherein said medium is disc-shaped.

7. The information recording medium defined in claim 5, wherein said transparent substrate is selected from the group consisting of polymethyl methacrylate, photo polymer and polycarbonate.

8. The information recording medium defined in claim 5, wherein said light-reflecting coating is selected from the group consisting of gold, silver and aluminum.

9. The information recording medium defined in claim 5, wherein said protective coating is lacquer.

* * * * *